UNITED STATES PATENT OFFICE.

MARTIN LANGE AND TADENSZ EMILEWICZ, OF AMSTERDAM, NETHERLANDS.

PROCESS OF MAKING MORDANT COLORS.

SPECIFICATION forming part of Letters Patent No. 702,445, dated June 17, 1902.

Application filed December 11, 1900. Serial No. 39,479. (Specimens.)

*To all whom it may concern:*

Be it known that we, MARTIN LANGE, chemist, a subject of the King of Prussia, German Emperor, residing at Nicolas Witsarkade 35, and TADENSZ EMILEWICZ, chemist, a subject of the Emperor of Austria-Hungary, residing at Singel 325, Amsterdam, Netherlands, have invented certain new and useful Improvements in Processes of Making Mordant Colors, of which the following is a specification.

If in the nucleus of 1.8 dioxynaphthalene (*Erdmann Am.*, 247, page 358) the residue of a fatty or aromatic carboxylic acid is introduced, ketones of the dioxynaphthalene are formed, which have the valuable property of dyeing on mordants of iron, aluminium, &c., in the manner of alizarin colors. On aluminium mordants yellow to orange shades are obtained, according to the residue of carboxylic acid which is introduced. The general formula

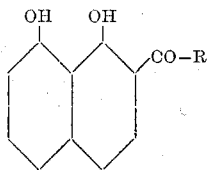

for the new coloring-matters is most probable.

From different processes for producing these new colors can be used—

1. By heating the carboxylic acids or their anhydrids with 1.8 dioxynaphthalene under addition of condensing substances, as $ZnCl_2$, $SnCl_4$, $Al_2Cl_6$, $H_2SO_4$, &c.

2. By condensing 1.8 dioxynaphthalene with acid chlorids or bromids of the general formula R—CoCl under addition of the above condensing substances.

3. By condensing the 1.8 dioxynaphthalene with the corresponding trichlorids or bromids of the general formula $R—C.Cl_3$.

4. By heating the mono or di acidyl derivatives of 1.8 dioxynaphthalene of the formula

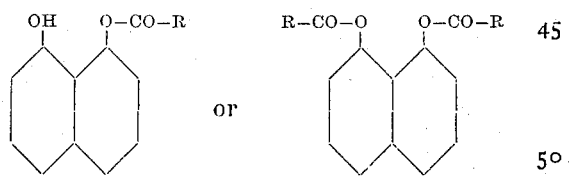

with the above-mentioned condensing substances.

We obtain a dye producing a nice yellow on aluminium mordant by heating in a suitable vessel sixty kilos 1.8 dioxynaphthalene with about one hundred kilos acetic acid or with thirty-nine kilos acetic anhydrid and about eighty kilos $ZnCl_2$ until the 1.8 dioxynaphthalene has disappeared. The product is purified in the usual manner. It crystallizes in small yellowish needles, melting at about 101° centigrade.

By using process II the same stuff is obtained by mixing one hundred and sixty-eight kilos 1.8 dioxynaphthalene with about one hundred and twenty-five kilos acetylchlorid and about one hundred kilos $ZnCl_2$ and heating finally.

By using process III we heat sixteen kilos 1.8 dioxynaphthalene with twenty kilos benzotrichlorid and one hundred and twenty kilos diluted alcohol to 70° to 80° centigrade till all the benzotrichlorid has disappeared. The dioxybenzoylnaphton dyes aluminium mordant brilliant orange. The dioxybenzonaphton crystallizes from diluted alcohol in long orange-brown needles, melting at about 122° centigrade.

By using process IV the same dye is obtained by melting the mono or di acetyldioxynaphthalene with $ZnCl_2$, heating until the production of the ketone is finished.

If we use in these examples instead of acetic acid one of the higher homologues or the corresponding derivatives of same, we obtain the corresponding dioxy ketones.

For the production of ketones of the 1.8 dioxynaphthalene containing two aromatic nuclei we heat, for instance, thirty-two kilos 1.8 dioxynaphthalene with twenty-four kilos benzoic acid or thirty-two kilos benzoylchlorid and forty kilos $ZnCl_2$ to 130° to 140° centigrade, or we heat the mono or di benzoyldioxynaphthalene with $ZnCl_2$ up to melting.

Having now particularly described and ascertained the nature of the said invention and in what manner same is to be performed, we declare that what we claim is—

The herein-described process of making a yellow-mordant color, by condensing 1.8 dioxynaphthalene with a substance containing the carboxylic-acid molecule; whereby said carboxylic-acid radical is bound to the nucleus of the 1.8 dioxynaphthalene, substantially as described.

Signed at Amsterdam this 28th day of November, 1900.

MARTIN LANGE.
TADENSZ EMILEWICZ.

Witnesses:
GUSTAV CRONHEIM,
AUGUST SIEGFRIED DOCEN.